(12) United States Patent
Sugioka et al.

(10) Patent No.: US 12,383,994 B2
(45) Date of Patent: Aug. 12, 2025

(54) SCREW DRIVING DEVICE

(71) Applicant: OMRON Corporation, Kyoto (JP)

(72) Inventors: Masayuki Sugioka, Kyoto (JP); Masayoshi Tsukikawa, Kyoto (JP); Kota Miyamoto, Kyoto (JP); Kento Tsuchikawa, Kyoto (JP); Yuki Sakamoto, Kyoto (JP)

(73) Assignee: OMRON Corporation, Kyoto (JP)

( * ) Notice: Subject to any disclaimer, the term of this patent is extended or adjusted under 35 U.S.C. 154(b) by 337 days.

(21) Appl. No.: 17/925,309

(22) PCT Filed: Mar. 4, 2021

(86) PCT No.: PCT/JP2021/008424
§ 371 (c)(1),
(2) Date: Nov. 14, 2022

(87) PCT Pub. No.: WO2021/261021
PCT Pub. Date: Dec. 30, 2021

(65) Prior Publication Data
US 2023/0234175 A1    Jul. 27, 2023

(30) Foreign Application Priority Data

Jun. 22, 2020 (JP) ................................ 2020-107262

(51) Int. Cl.
*B23P 19/06* (2006.01)
(52) U.S. Cl.
CPC ................................ *B23P 19/066* (2013.01)

(58) Field of Classification Search
CPC ... B25B 21/002; B25B 21/02; B25B 23/0028; B25B 23/0064; B25B 23/02;
(Continued)

(56) References Cited

U.S. PATENT DOCUMENTS 4,142,591 A    3/1979    Himmelstein
6,144,891 A    11/2000   Murakami et al.
(Continued)

FOREIGN PATENT DOCUMENTS

CN    1590029       3/2005
CN    102695588     9/2012
(Continued)

OTHER PUBLICATIONS

Guiqing Sun et al., "Application Experiment of "Torque-Angle" Method for Engine Disk and Shaft Connection", Aeronautical Manufacturing Technology, May 1, 2019, with English abstract, pp. 76-79 and 93, vol. 62, No. 9.
(Continued)

*Primary Examiner* — Robert J Scruggs
(74) *Attorney, Agent, or Firm* — JCIPRNET

(57) ABSTRACT

According to the present invention, an axial force of a screw which is generated by screw driving is estimated. A control part applies a predetermined torque generated by a rotation axis servomotor to a screw in a rotation direction where a screw is driven, and thereafter releases the torque. The control part then estimates an axial force of the driven screw based on fluctuation of a rotation position of the rotation axis servomotor which occurs due to the release of the torque.

20 Claims, 9 Drawing Sheets

(58) Field of Classification Search
CPC ....... B25B 23/14; B25B 23/147; B23P 19/06; B23P 19/065; B23P 19/066; B23P 19/069; G05B 19/19; G05B 19/418; G05B 19/41875; G05B 2219/45203
See application file for complete search history.

(56) References Cited

U.S. PATENT DOCUMENTS

| | | | | |
|---|---|---|---|---|
| 11,816,550 | B1* | 11/2023 | Gupta | G06N 5/01 |
| 2008/0209707 | A1* | 9/2008 | Cioto | B25B 23/147 |
| | | | | 702/41 |
| 2012/0167721 | A1* | 7/2012 | Fluhrer | B25F 5/00 |
| | | | | 173/1 |
| 2019/0227528 | A1* | 7/2019 | Abbott | G05B 13/027 |

FOREIGN PATENT DOCUMENTS

| | | | |
|---|---|---|---|
| CN | 110399935 | * | 11/2019 |
| JP | S6039434 | | 3/1985 |
| JP | H03107138 | | 11/1991 |
| JP | H07223132 | | 8/1995 |
| JP | 2004291217 | | 10/2004 |
| JP | 2013132693 | * | 7/2013 |
| JP | 2015058523 | | 3/2015 |
| JP | 5886921 | | 3/2016 |
| JP | 2019150922 | | 9/2019 |
| JP | 2020006452 | | 1/2020 |
| JP | 2020093319 | | 6/2020 |

OTHER PUBLICATIONS

"First Office Action Notification (National Phase Entry of PCT Application) of China Counterpart Application", issued on Oct. 17, 2024, with English translation thereof, pp. 1-14.

"International Search Report (Form PCT/ISA/210) of PCT/JP2021/008424", mailed on May 18, 2021, with English translation thereof, pp. 1-5.

"Written Opinion of the International Searching Authority (Form PCT/ISA/237) of PCT/ JP2021/008424", mailed on May 18, 2021, with English translation thereof, pp. 1-6.

"Search Report of Europe Counterpart Application", issued on Jul. 1, 2024, pp. 1-9.

* cited by examiner

| Step No. | Summary | R-axis and/or Z-axis movement | End of step |
|---|---|---|---|
| 0 | Descending | Moving at a predetermined moving speed (Vz) along the Z axis | Z-axis position (z) reaching the target position |
| 1 | Screw insertion | Rotating around the R axis at a predetermined rotation speed (Vr)<br>Moving along the Z axis according to the R-axis rotation | R-axis torque (Tr) reaching the threshold torque |
| 2 | Full driving | Increasing the R-axis torque (Tr)<br>Moving along the Z axis according to the R-axis rotation | R-axis torque (Tr) reaching the drive torque |
| 3 | Driving | Maintaining the R-axis torque (Tr) at the drive torque<br>Moving along the Z axis according to the R-axis rotation | Drive time elapsing |
| 4 | Release of driving | Decreasing the R-axis torque (Tr)<br>Moving along the Z axis according to the R-axis rotation | R-axis torque (Tr) reaching 0 |
| 5 | Returning to origin | Moving at a predetermined moving speed (Vz) along the Z axis<br>Rotating around the R axis | Z-axis position (z) returning to the origin position<br>R-axis position (r) returning to the origin position |

FIG. 3

SCREW DRIVING DEVICE

CROSS-REFERENCE TO RELATED APPLICATION

This application is a 371 application of the International PCT application serial no. PCT/JP2021/008424, filed on Mar. 4, 2021, which claims the priority benefits of Japan Patent Application No. 2020-107262, filed on Jun. 22, 2020. The entirety of each of the above-mentioned patent applications is hereby incorporated by reference herein and made a part of this specification.

TECHNICAL FIELD

The disclosure relates to a screw driving device that estimates an axial force of a screw generated by screw driving.

RELATED ART

Patent Literatures 1 and 2 as listed below disclose techniques for determining screw driving failures. Patent Literature 1 relates to a screw driving failure determination device which determines the occurrence and type of failure in screw driving; it determines the occurrence and type of failure in the screw driving operation by the driver based on two or more variables with respect to a first motor that provides rotational motion of the driver and a second motor that provides axial reciprocating motion of the driver.

Patent Literature 2 relates to a screw driving determination device which is connected to a screw driving device and that determines whether there is a screw driving failure to an object; it generates a waveform showing the relationship between the accumulated rotation angle and the current value in the screw driving device during screw driving, and determines the screw driving failure based on the amount of change in the accumulated rotation angle and current value in the waveform when screw driving is completed.

CITATION LIST

Patent Literature

[Patent Literature 1] Japanese Patent Application Laid-Open No. 2020-6452
[Patent Literature 2] Japanese Patent Application Laid-Open No. 2019-150922

SUMMARY

Technical Problem

However, although Patent Literatures 1 and 2 described above disclose a technique for determining screw driving failures, they do not disclose a technique for determining screw driving failures by estimating the axial force of a screw.

An embodiment of the disclosure realizes a screw driving device that estimates the axial force of a screw generated by screw driving.

Solution to Problem

The disclosure adopts the following configurations in view of the above-described problems. A screw driving device according to an embodiment of the disclosure includes: a rotary tool for rotating a screw; a first motor that drives the rotary tool to rotate; and a control part that controls the first motor. The control part: applies a predetermined torque generated by the first motor to the screw in a rotation direction where the screw is driven, then performs a step of releasing the torque, and estimates an axial force of the driven screw based on a change of a rotation position of the first motor in the step of releasing the torque.

Effects of Invention

According to an embodiment of the disclosure, it is possible to estimate the axial force of the screw generated by screw driving.

BRIEF DESCRIPTION OF THE DRAWINGS

FIG. 3 is a table showing a processing procedure of a screw driving operation of the screw driving device according to this embodiment.

DESCRIPTION OF THE EMBODIMENTS

Hereinafter, embodiments according to one aspect of the disclosure will be described based on the drawings.

§ 1 Application Example

Figure 1:
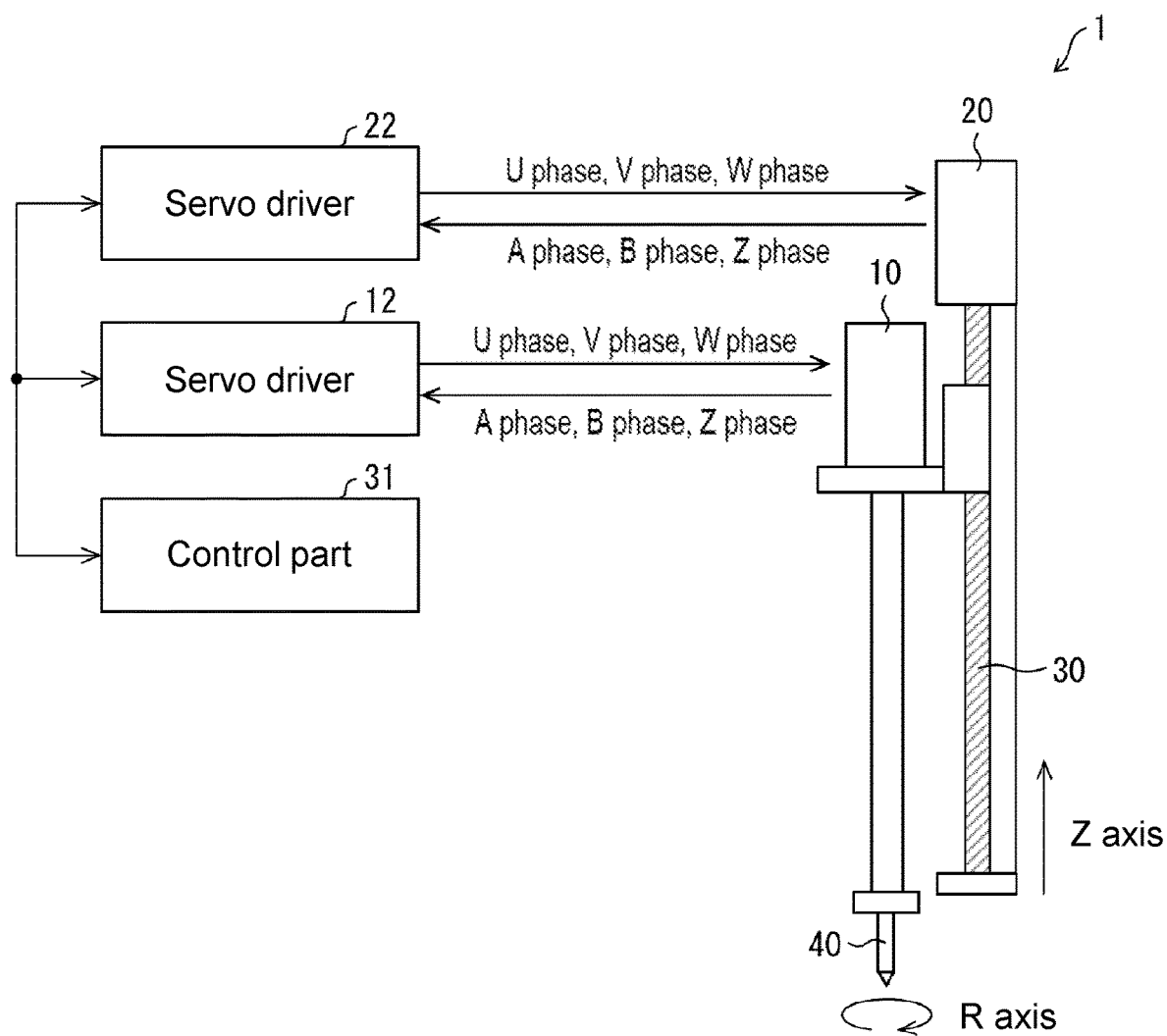
FIG. 1 is a diagram showing an overall configuration of a screw driving device according to an embodiment.

FIG. 1 is a diagram showing an overall configuration of a screw driving device 1 according to this embodiment. The screw driving device 1 includes a rotation axis servomotor (first motor) 10, a servo driver 12 that controls the rotation of the rotation axis servomotor 10, an elevation axis servomotor (second motor) 20, a servo driver 22 that controls the rotation of the elevation axis servomotor 20, a ball screw 30, a control part 31 for transmitting instructions such as torque commands to the servo drivers 12 and 22, and a driver bit (rotary tool) 40.

Further, though not shown in FIG. 1, the screw driving device 1 further includes an encoder 11 provided on the rotation axis servomotor 10 and an encoder 21 provided on the elevation axis servomotor 20.

The driver bit 40 is attached to the rotation axis of the rotation axis servomotor 10 and rotates around the R axis as the rotation axis servomotor 10 rotates. By rotating the driver bit 40, the screw to be screwed is driven.

Further, the rotation axis servomotor 10 and the driver bit 40 are connected to the elevation axis servomotor 20 via the ball screw 30. The rotation motion of the elevation axis servomotor 20 is converted into linear motion in the Z-axis direction by the ball screw 30, and the rotation axis servomotor 10 and the driver bit 40 are raised and lowered.

The control part 31 controls the rotation angle (rotation position), rotation speed, and torque of the rotation axes of the rotation axis servomotor 10 and the elevation axis servomotor 20, controls the raising and lowering of the driver bit 40 by the rotation of the elevation axis servomotor 20, and controls the screw driving by the driver bit 40 by the rotation of the rotation axis servomotor 10.

The control part 31 controls the raising and lowering of the elevation axis servomotor 20 to fit the tip of the driver bit 40 into the groove of the head of the male screw, and applies a predetermined torque generated by the rotation axis servomotor to the screw in a rotation direction where the screw is driven, and then starts the step of releasing the torque. At the start of the step of releasing the torque, the control part 31 acquires a first rotation angle (rotation position) of the rotation axis of the rotation axis servomotor 10.

After releasing the predetermined torque, the control part 31 ends the step of releasing the torque. At the end of the step of releasing the torque, the control part 31 acquires a second rotation angle (rotation position) of the rotation axis of the rotation axis servomotor 10. Then, the control part 31 obtains the difference between the first rotation angle and the second rotation angle, and estimates the axial force of the screw based on the change in the rotation angle.

Since the control part 31 estimates the axial force of the driven screw based on the change in the rotation position of the first motor, there is no need to measure the actual axial force of the screw, making it easy to determine the quality of the driving of the screw.

§ 2 Configuration Example

Figure 2:
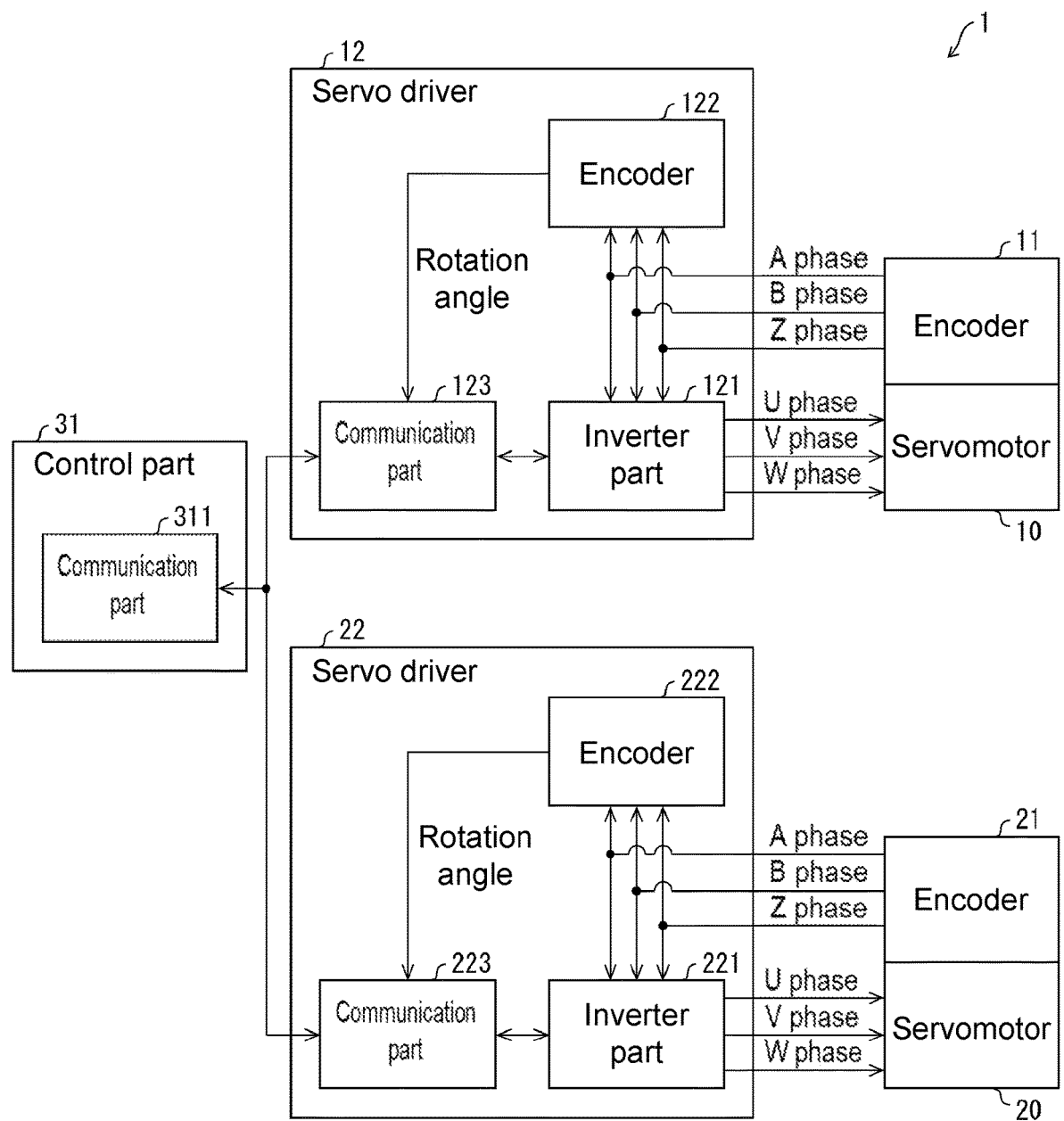
FIG. 2 is a block diagram showing a schematic configuration of the screw driving device according to this embodiment.

FIG. 2 is a block diagram showing a schematic configuration of the screw driving device 1 according to this embodiment. The screw driving device 1 includes the rotation axis servomotor 10, the encoder 11 provided in the rotation axis servomotor 10, the servo driver 12 that controls the rotation of the rotation axis servomotor 10, the elevation axis servomotor 20, the encoder 21 provided in the elevation axis servomotor 20, the servo driver 22 that controls the rotation of the elevation axis servomotor 20, and the control part 31 that performs overall control of the screw driving device 1.

The encoders 11 and 21 obtain the rotation angles of the rotation axes of rotation axis servomotor 10 and elevation axis servomotor 20, respectively, and generate and output an A-phase signal, a B-phase signal and a Z-phase signal as feedback signals.

The rotation axis servomotor 10 is configured by a three-phase AC motor, and the rotation axis servomotor 10 is driven according to three-phase drive signals (U-phase signal, V-phase signal, and W-phase signal) output from the servo driver 12. Similarly, the elevation axis servomotor 20 is configured by a three-phase AC motor, and the elevation axis servomotor 20 is driven according to three-phase drive signals (U-phase signal, V-phase signal, and W-phase signal) output from the servo driver 22.

The servo driver 12 includes an inverter part 121, an encoder 122 and a communication part 123. The servo driver 22 also includes an inverter part 221, an encoder 222 and a communication part 223. In addition, the inverter part 121 and the inverter part 221 have the same configuration and functions; the encoder 122 and the encoder 222 have the same configuration and functions, and the communication part 123 and the communication part 223 have the same configuration and functions. Accordingly, only the details of the servo driver 12 will be described, and the detailed description of the servo driver 22 will not be repeated.

When the inverter part 121 receives commands of the rotation angle (rotation position), rotation speed, and torque from the control part 31 via the communication part 123, the inverter part 121 controls the rotation axis servomotor 10 according to the commands. Specifically, the inverter part 121 generates a pulse width modulation (PWM) waveform according to a command from the control part 31 and a feedback signal from the encoder 11, and generates an alternating current of a required frequency from the direct current. At this time, a U-phase signal, a V-phase signal, and a W-phase signal, which are three drive signals having different phases, are generated and supplied to the rotation axis servomotor 10.

Further, the inverter part 121 receives a feedback signal from the encoder 11 provided in the rotation axis servomotor 10, obtains the actual rotation angle, rotation speed and drive torque of the rotation axis servomotor 10, and compares them with commands from the control part 31 to detect errors between them. Then, the operation of the rotation axis servomotor 10 is corrected in real time with this error information. The inverter part 121 feeds back the actual rotation speed and drive torque of the rotation axis servomotor 10 to the control part 31 via the communication part 123.

The encoder 122 obtains the actual rotation angle of the rotation axis of the rotation axis servomotor 10 based on the feedback signal from the encoder 11 and feeds it back to the control part 31 via the communication part 123.

The communication part 123 communicates with the control part 31 through, for example, a local area network (LAN). The communication part 123 receives commands of the rotation angle (rotation position), rotation speed, and torque from the control part 31 and outputs the commands to the inverter part 121. Further, upon receiving the actual rotation angle of the rotation axis of the rotation axis servomotor 10 from the encoder 122 and the actual rotation speed and drive torque of the rotation axis servomotor 10 from the inverter part 121, the communication part 123 transmits the information to the control part 31.

The control part 31 has a communication part 311, and communicates with the servo drivers 12 and 22 via, for example, a LAN. The control part 31 transmits commands of the rotation angle, rotation speed and torque to the servo drivers 12 and 22 via the communication part 311. In addition, the control part 31 receives feedback information regarding the actual rotation angle, rotation speed, and drive torque of the rotation axes of the rotation axis servomotor 10 and the elevation axis servomotor 20 from the servo drivers 12 and 22 via the communication part 311.

§ 3 Operation Example

First Embodiment

Figure 4:
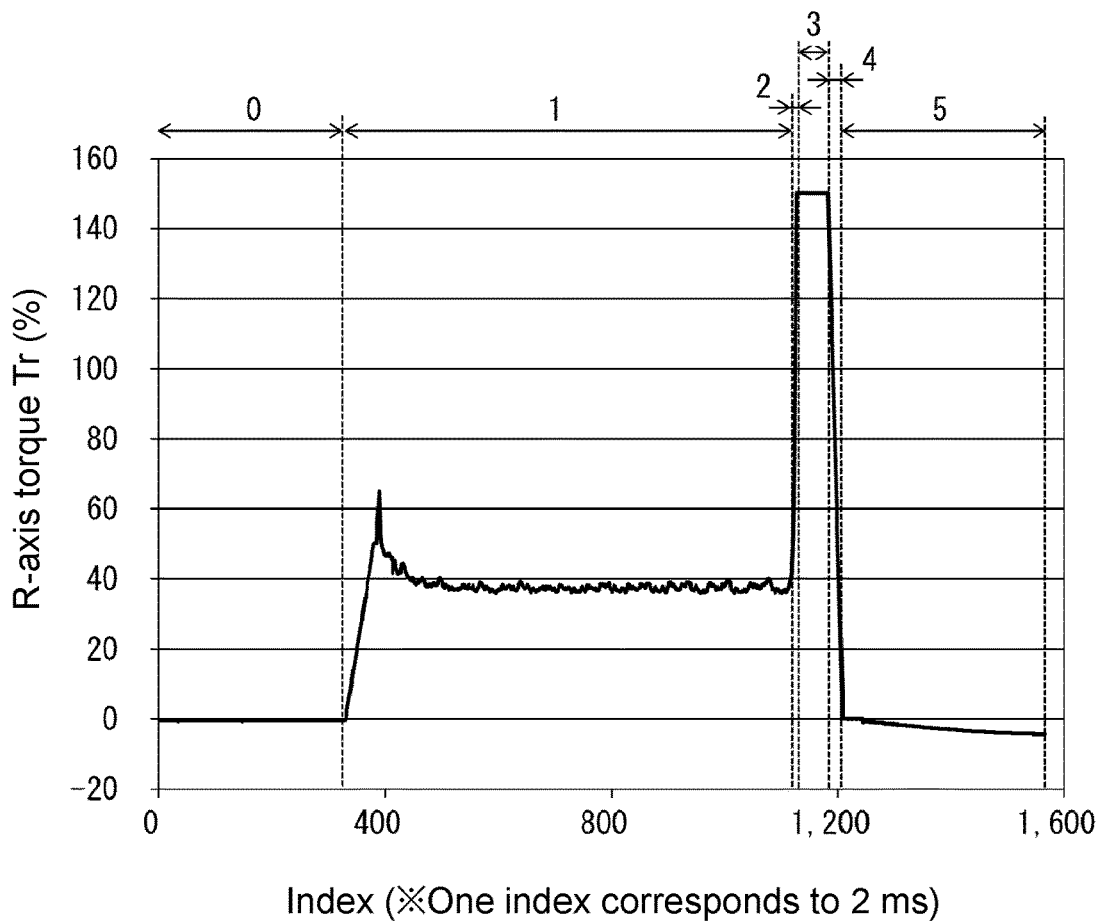
FIG. 4 is a graph showing the rotation axis torque (R-axis torque) of the rotation axis servomotor at each step shown in FIG. 3.

FIG. 3 is a table showing a processing procedure of a screw driving operation of the screw driving device 1 according to this embodiment. Further, FIG. 4 is a graph showing the rotation axis torque (R-axis torque) of the rotation axis servomotor 10 at each step shown in FIG. 3. In this graph, the horizontal axis is time, and the vertical axis is R-axis torque. One index of time on the horizontal axis corresponds to 2 ms. Further, the R-axis torque on the vertical axis is expressed as a ratio with the rated torque being 100%. Hereinafter, the operation of the screw driving device 1 according to this embodiment will be described with reference to FIGS. 3 and 4 as appropriate.

First, the control part 31 transmits commands of the rotation angle, rotation speed, and torque of the elevation axis servomotor 20 to the servo driver 22. The servo driver 22 generates a drive waveform according to the commands from the control part 31 and supplies it to the elevation axis servomotor 20 (step 0 start). At this time, the driver bit 40 is at the origin position and descends along the Z axis at a predetermined moving speed (Vz) according to the drive waveform.

The position (z) and moving speed (Vz) of the driver bit 40 may be calculated from the rotation angle and rotation speed of the rotation axis of the elevation axis servomotor 20. The control part 31 moves the driver bit 40 to the target position.

When the control part 31 detects that the Z-axis position (z) of the driver bit 40 has reached the target position, it instructs the servo driver 22 to stop driving the elevation axis servomotor 20 (end of step 0). As shown in FIG. 4, during step 0, the rotation axis servomotor 10 is not driven, so the R-axis torque remains zero.

Next, the control part 31 transmits a command of the rotation speed of the rotation axis servomotor 10 to the servo driver 12. The servo driver 12 generates a drive waveform according to the command from the control part 31 and supplies it to the rotation axis servomotor 10. At this time, the driver bit 40 rotates around the R axis at a predetermined rotation speed (Vr), and screw driving is started (start of step 1 (first step)).

In addition, since the rotation of the screw causes the screw to move downward, the control part 31 rotates the elevation axis servomotor 20 in synchronization with the amount of movement of the screw, thereby moving the driver bit 40 downward along the Z axis. At this time, if the tip of the driver bit 40 does not fit into the groove of the head of the screw, it will fit into the groove of the head of the screw by rotating the driver bit 40 around the R axis and moving it downward.

As shown in FIG. 4, since the rotation axis of rotation axis servomotor 10 rotates at a predetermined rotation speed (Vr), the R-axis torque increases, but overshoot occurs only at the beginning. The control part 31 determines whether the R-axis torque has reached a threshold torque (for example, 62%) to determine whether it is in a temporarily seated state (the bearing surface of the screw is in contact with the part to be fastened). Since it is necessary to exclude the R-axis torque overshoot, it is not determined whether the vehicle is in the temporarily seated state for 1000 ms from the start of step 1.

When the screw is in the temporarily seated state, the servo driver 12 tries to maintain a predetermined rotation speed (Vr), and the R-axis torque further increases. The control part 31 proceeds to step 2 when the drive torque received from the servo driver 12 reaches the threshold torque. In this way, the control part 31 rotates the rotation axis servomotor 10 around the R axis at a predetermined rotation speed and moves the driver bit 40 downward along the Z-axis direction by the rotation of the elevation axis servomotor 20 until the R-axis torque reaches the threshold torque (end of step 1).

Next, the control part 31 causes the servo driver 12 to maintain a predetermined rotation speed (Vr) in order to perform full driving of the screw. In this way, the R-axis torque increases. Here, about 150% R-axis torque is set as the drive torque (start of step 2 (second step)).

Further, since the screw moves downward due to full driving of the screw, the control part 31 rotates the elevation axis servomotor 20 in synchronization with the amount of movement, thereby moving the driver bit 40 downward along the Z axis. As shown in FIG. 4, the R-axis torque (Tr) of the rotation axis servomotor 10 reaches the drive torque (end of step 2).

Next, when the control part 31 detects that the R-axis torque (Tr) of the rotation axis servomotor 10 has reached the drive torque, the torque command to the servo driver 12 is maintained at the drive torque, so that the drive torque of the screw is maintained as it is, and driving is performed. As shown in FIG. 4, the drive torque is maintained for a predetermined period of time. During this predetermined period of time, the screw will stop rotating and no further driving will occur (end of step 3).

Further, since the screw moves downward due to driving of the screw, the control part 31 rotates the elevation axis servomotor 20 in synchronization with the amount of movement, thereby moving the driver bit 40 downward along the Z axis.

Next, the control part 31 transmits a command to decrease the R-axis torque (Tr) to the servo driver 12 (start of step 4). Further, the control part 31 sets the rotation angle of the rotation axis of the rotation axis servomotor 10 at the start of step 4 as the first rotation angle. Then, the control part 31 transmits a command to the servo driver 12 so that the R-axis torque (Tr) of the rotation axis servomotor 10 is reduced to zero. At this time, as the R-axis torque is released, the screw is slightly rotated in the direction opposite to the driving direction. The rotation angle of the rotation axis of the rotation axis servomotor 10 at this time is set as the second rotation angle (end of step 4).

Finally, the control part 31 transmits commands of the rotation angle, rotation speed, and torque of the elevation axis servomotor 20 to the servo driver 22. The servo driver 22 generates a drive waveform according to the commands from the control part 31 and supplies it to the elevation axis servomotor 20 (start of step 5). At this time, the driver bit 40 rises along the Z axis at a predetermined moving speed (Vz).

Further, the control part 31 transmits commands of the rotation angle, rotation speed, and torque of the rotation axis servomotor 10 to the servo driver 12. The servo driver 12 generates a drive waveform according to the commands from the control part 31 and supplies it to the rotation axis servomotor 10. At this time, the driver bit 40 rotates around the R axis at a predetermined rotation speed (Vr). The control part 31 ends the process when the rotation angle (R-axis position (r)) of the rotation axis of the rotation axis servomotor 10 and the Z-axis position (z) of the driver bit 40 return to the origin position (end of step 5).

Figure 5:
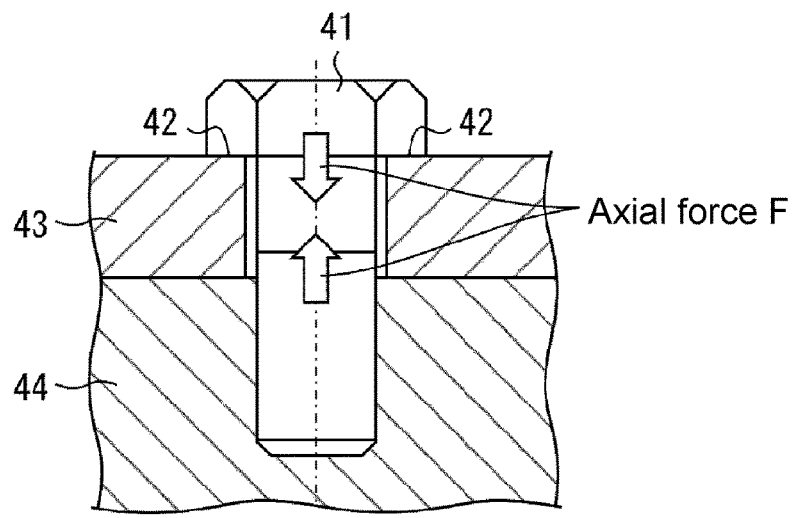
FIG. 5 is a diagram schematically showing an axial force generated by screw driving.

FIG. 5 is a diagram schematically showing an axial force generated by screw driving. The male screw 41 is driven to a fastener (female screw) 44 so that an object to be fastened 43 is sandwiched between bearing surfaces 42. At this time, the bearing surface 42 of the male screw 41 generates an axial force F having the same magnitude as the force for driving the object to be fastened 43. That is, the axial force F increases as the driving force by the male screw 41 increases.

As described with reference to FIG. 3, with the rotation angle of the rotation axis of the rotation axis servomotor 10 when the driving of the screw is completed in step 3 being defined as the first rotation angle, and the rotation angle when the screw is released from driving in step 4 being defined as the second rotation angle, the rotation angle of the screw returns by (first rotation angle—second rotation angle). This return of the rotation angle of the screw (the rotation axis of the rotation axis servomotor 10) is called a change in the rotation position.

When the axial force F is small, the surface pressure (screw contact surface pressure) of the bearing surface 42 becomes small, and the rotational resistance becomes small. As a result, the change in the rotation position of the screw (the rotation axis of the rotation axis servomotor 10) increases.

Further, when the axial force F is large, the surface pressure (screw contact surface pressure) of the bearing surface 42 increases, and the rotational resistance increases. As a result, the change in the rotation position of the screw (the rotation axis of the rotation axis servomotor 10) decreases. The control part 31 estimates the axial force F according to this change in the rotation position.

Figure 6:
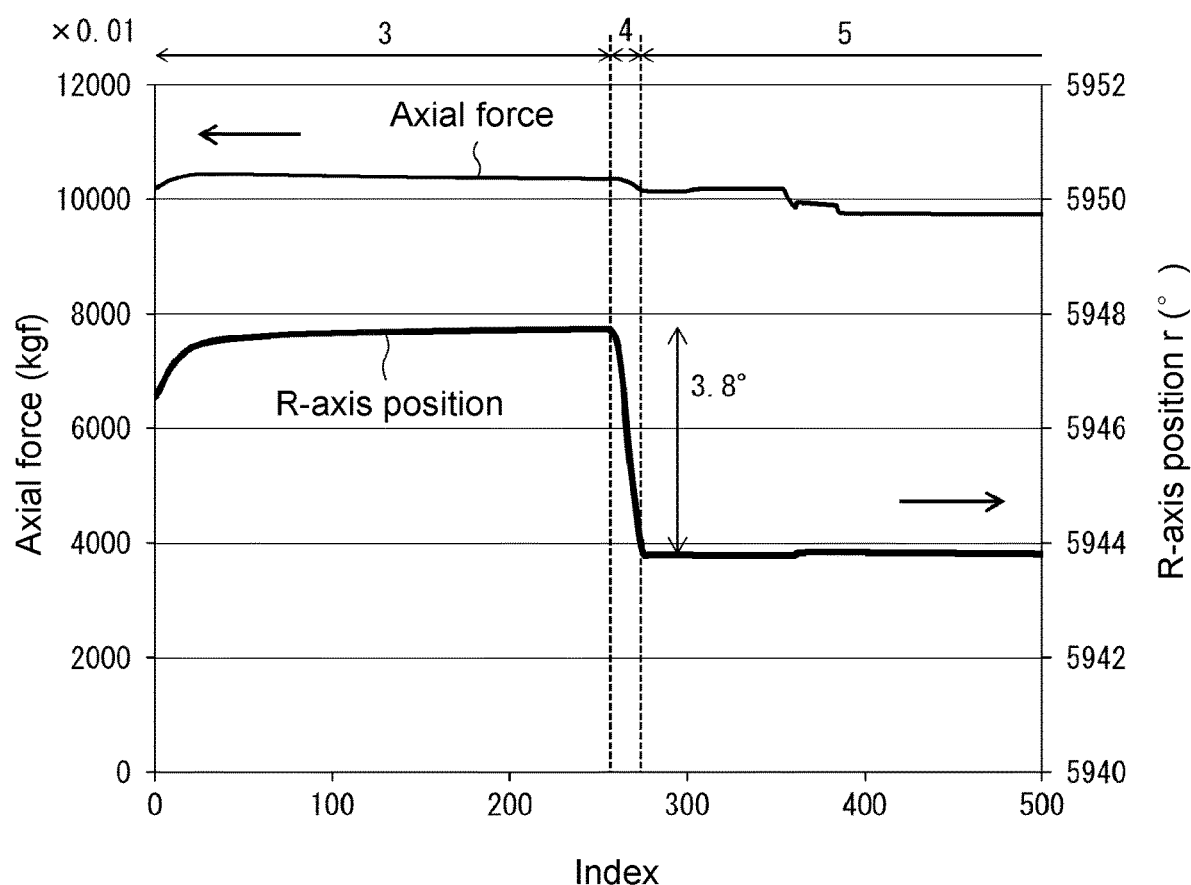
FIG. 6 is a graph showing the relationship between a change in the rotation position and the axial force of the screw in a normal condition.

FIG. 6 is a graph showing the relationship between a change in the rotation position and the axial force F of the screw in a normal condition. As described with reference to FIGS. 3 and 4, the drive torque of the screw is maintained for a predetermined period of time (step 3), and when the drive torque is released (step 4), a change in the rotation position occurs. In FIG. 6, the change in the rotation position occurs by 3.8°. At this time, the axial force F becomes approximately 100 kgf.

In FIGS. 6 to 9, since the axial force of the screw cannot be measured in a normal process, the screw is driven with a load cell sandwiched between the object to be fastened 43 and the fastener 44, and the axial force of the screw is experimentally measured.

Figure 7:
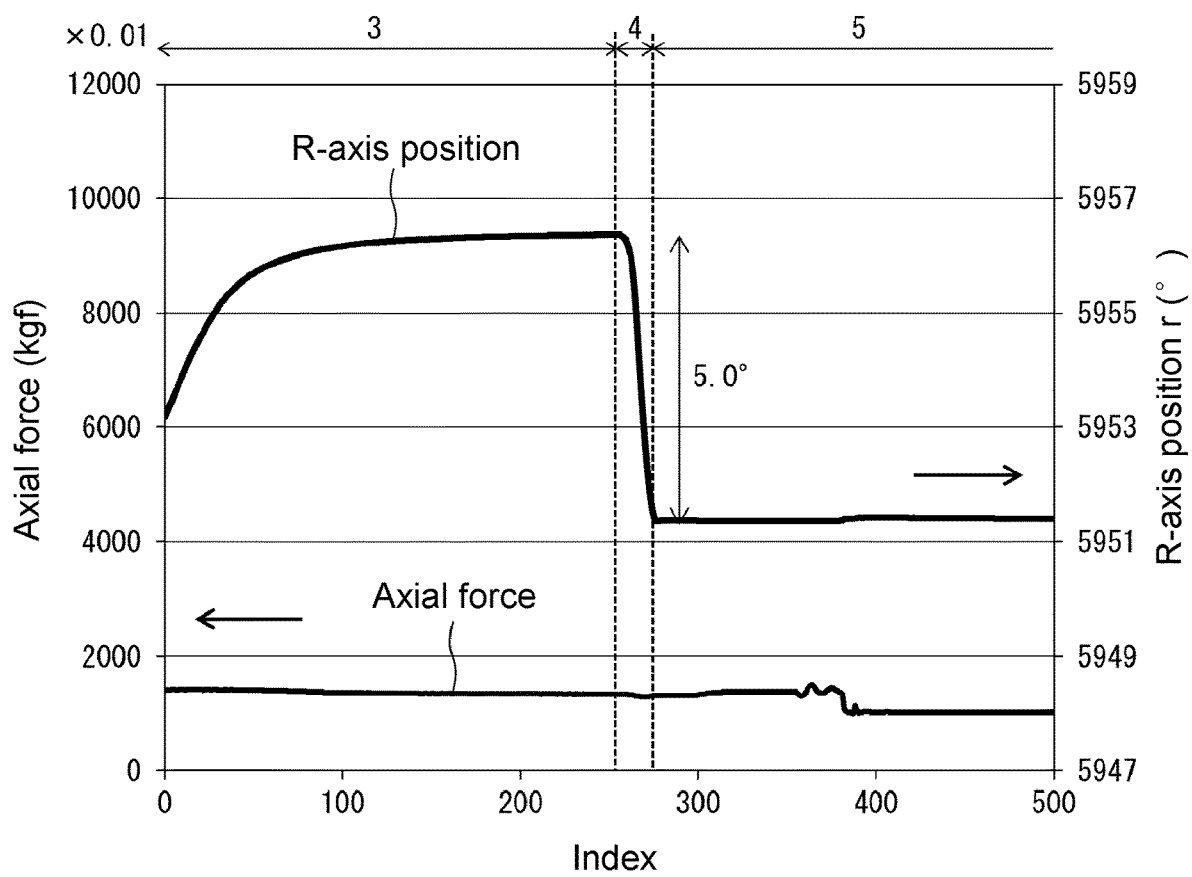
FIG. 7 is a graph showing the relationship between a change in the rotation position and the axial force of the screw at the time of bottom hitting.

FIG. 7 is a graph showing the relationship between a change in the rotation position and the axial force F of the screw when bottom hitting. Bottom hitting is a state in which the tip of the male screw 41 is in contact with the bottom of the female screw 44, and normal screw driving cannot be performed. When bottom hitting occurs, the tip of the male screw 41 or the bottom of the female screw 44 is crushed during full driving, and normal screw driving cannot be performed. As a result, compared with normal screw driving, the axial force F decreases, and the amount of change in the rotation position of the screw is increased.

In FIG. 7, the amount of change in the rotation position occurs by 5.0°. At this time, the axial force F becomes approximately 10 kgf. Thus, it may be seen that there is a correlation between the amount of change in the rotation position of the screw and the axial force F.

As described above, according to the screw driving device according to this embodiment, when the axial force F is small, the surface pressure of the bearing surface 42 is small, and the rotational resistance is small. As a result, the change in the rotation position of the screw increases. Moreover, when the axial force F is large, the surface pressure of the bearing surface 42 becomes large, and the rotational resistance becomes large. As a result, the change in the rotation position of the screw decreases. The control part 31 may estimate the axial force F according to this change in the rotation position.

Second Embodiment

In the first embodiment, the axial force of the screw was estimated only by the R-axis position range, but it was further examined whether there is a variable that may improve the accuracy of axial force estimation. The disclosure proposes the following equation as a model for estimating the axial force F as a result of experiments. Here, y is the estimated axial force; $x_1$ is the standard deviation of the Z-axis torque in step 1; $x_2$ is the average R-axis speed in step 2; $x_3$ is the amount of change in the R-axis position in step 4 (maximum value of R-axis position-minimum value of R-axis position (R-axis position range)). Further, a, b, c, and d are constants obtained by experiments.

$$y=ax_1+bx_2+cx_3+d \quad (1)$$

In step 1, if the screw is not properly seated and it spins idle, a constant torque is generated for a long time without the R-axis torque reaching the threshold torque. At this time, the standard deviation $x_1$ of the Z-axis torque decreases. From this, the variable $x_1$ may be used to determine whether the temporary seating of the screw is successful (whether an axial force is generated).

In step 2, when it takes a long time for the R-axis torque to reach the target value due to improper screw driving, or when it does not reach the target value, the R-axis speed remains almost 0 for a long time, and the average R-axis speed $x_2$ becomes smaller. From this, the variable $x_2$ may be used to determine whether full driving of the screw is normally performed (whether the axial force is generated).

In step 4, when the R-axis torque is released, a rotation force is generated in the direction of loosening the screw. The amount of reverse rotation of the screw changes depending on the driven state of the screw, and the more tightly it is driven, the smaller the amount of rotation. That is, the R-axis position range $x_3$ becomes smaller. From this, the variable $x_3$ may be used to determine whether it is tightly driven after full driving (whether the axial force is generated). Variables that have a high correlation with (being replaceable with) this variable $x_3$ include, for example, the R-axis speed range in step 4.

Figure 8:
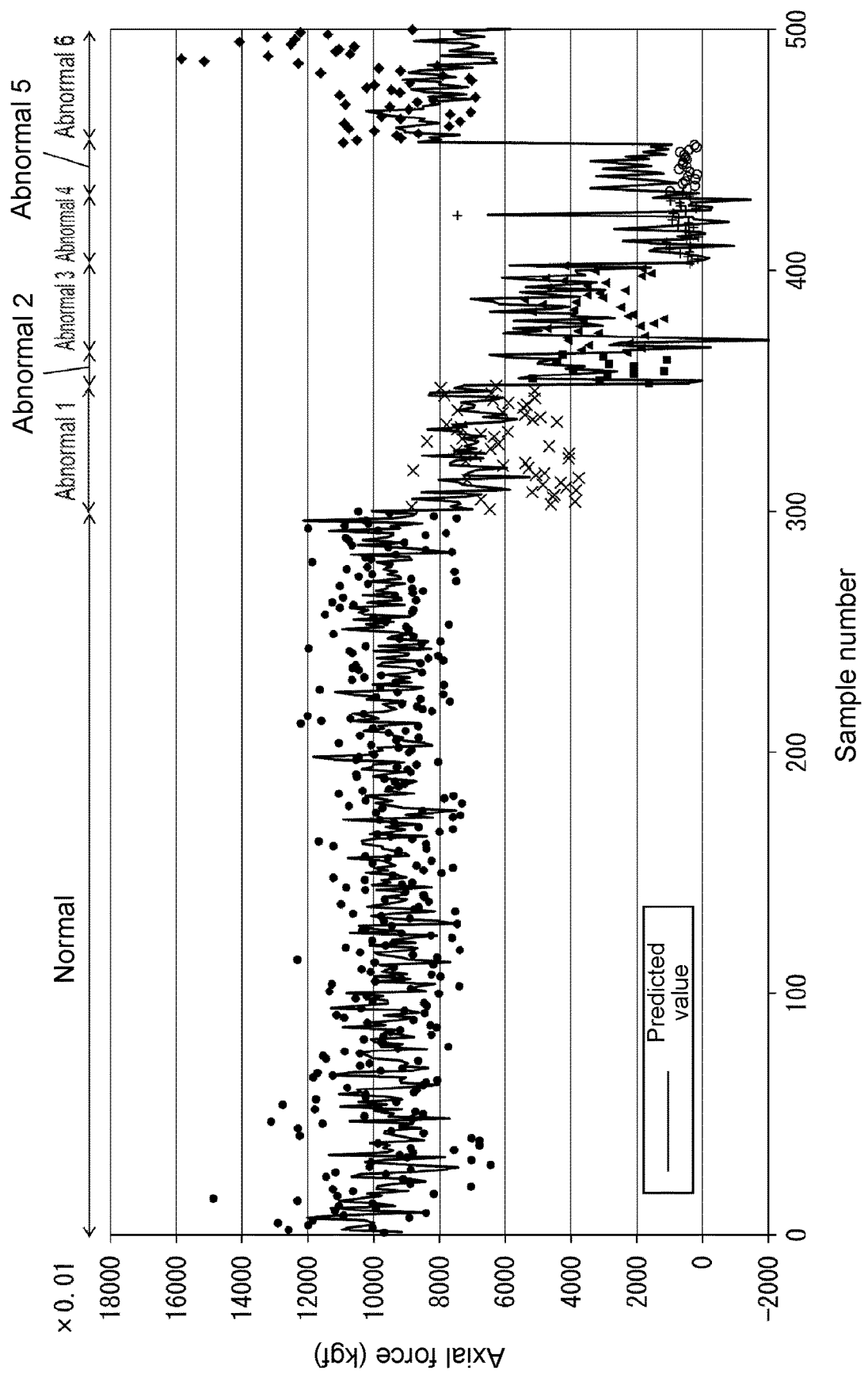
FIG. 8 is a graph showing an actually measured axial force of a screw and a predicted axial force value calculated using Equation (1).

FIG. 8 is a graph showing an actually measured axial force of a screw and a predicted axial force value calculated using Equation (1). In this graph, the horizontal axis is the sample number, and the vertical axis is the axial force (kgf). Sample numbers up to about 300 are samples in which screws were driven in a normal state, and sample numbers after that are samples in which screws were driven in a not-normal (abnormal) state. Measured axial force values are indicated by dots, and predicted axial force values are indicated by solid lines. The measured axial force values are shown in dots of different shapes for Normal and Abnormal 1 to 6, respectively.

The sample of Abnormal 1 is a sample of screw defective thread. Abnormal 2 to 5 are samples in which bottom hitting occurred, and are classified into four samples according to the level of bottom hitting. Abnormal 2 is the sample with the lightest degree of bottom hitting. Abnormal 5 is the sample with the highest degree of bottom hitting. Abnormal 3 and Abnormal 4 are intermediate samples. The sample of Abnormal 6 is a sample in which a foreign matter is caught between the bearing surface 42 of the male screw 41 and the object to be fastened 43.

As shown in FIG. 8, in Normal and Abnormal 1 to 5, the actually measured axial force of the screw and the predicted axial force value generally match. However, in Abnormal 6 (foreign matter caught), the difference between the actually measured axial force and the predicted axial force value of the screw is large, indicating that the prediction accuracy is not so good. Samples in which a foreign matter is caught are detected and removed by another method, and if the above axial force estimation is used only for the samples of Normal and Abnormal 1 to 5, the axial force may be estimated with higher accuracy.

Figure 9:
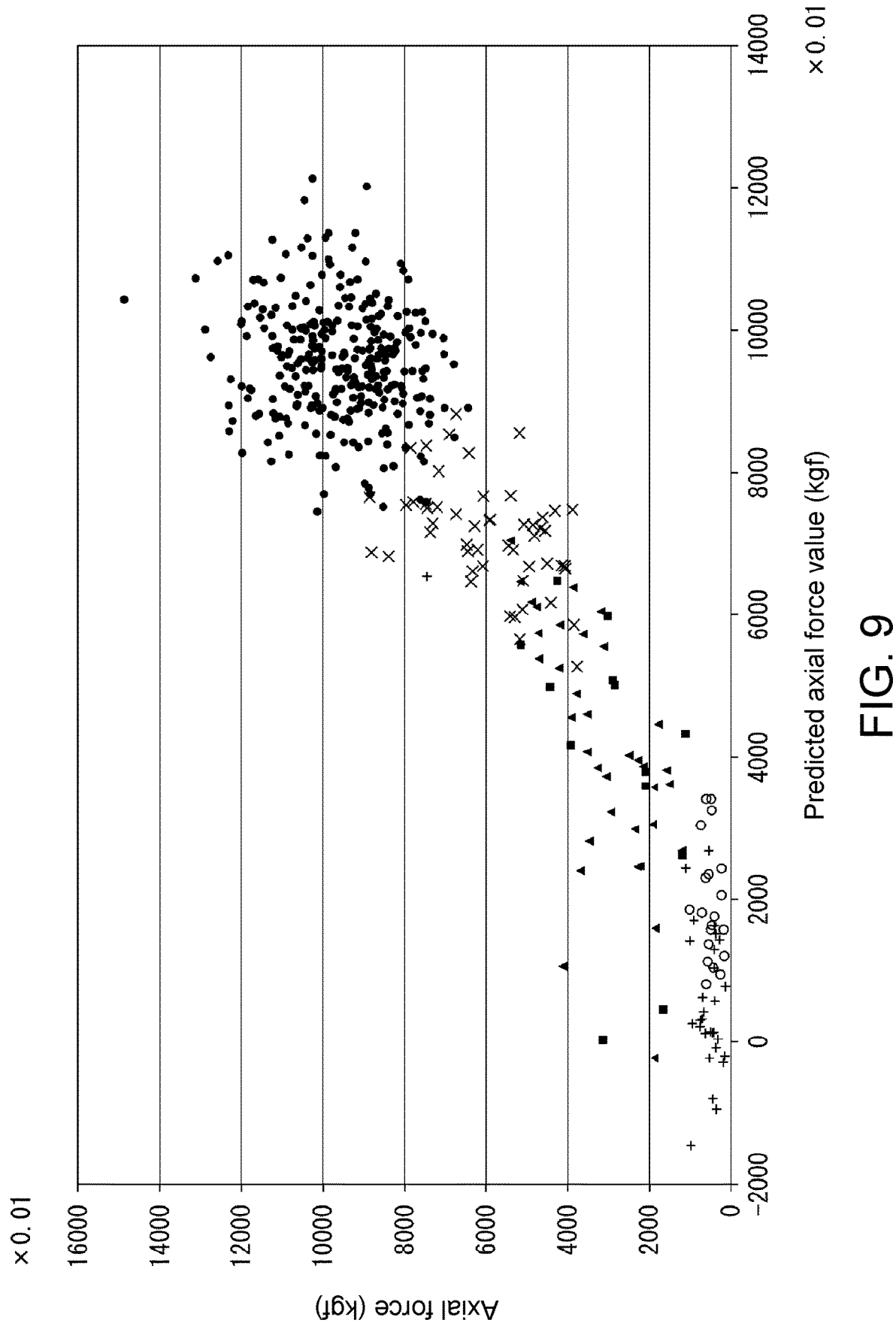
FIG. 9 is a graph plotting the predicted axial force value versus the measured value of each sample shown in FIG. 8.

FIG. 9 is a graph plotting the predicted axial force value versus the measured value of each sample shown in FIG. 8. In this graph, the horizontal axis is the predicted axial force value (kgf) and the vertical axis is the measured axial force value (kgf), and each point of the sample corresponds to each point of the sample shown in FIG. 8. In FIG. 9, the sample of Abnormal 6 (foreign object caught) shown in FIG. 8 is excluded.

As shown in FIG. 9, it may be seen that the predicted axial force value and the measured axial force value approximately match each of the samples of Normal and Abnormal 1 to 5. In addition, it becomes possible to roughly determine which of the states of the Normal and Abnormal 1 to 5 the samples are in based on the predicted axial force value.

As described above, since the control part 31 estimates the axial force of the screw using Equation (1), it is possible to estimate the axial force of the screw more accurately than estimating the axial force of the screw based only on the change in the rotation position of the screw.

Third Embodiment

Variables that have a high correlation with (being replaceable with) this variable $x_1$ include, for example, the average Z-axis position in step 1 (correlation coefficient with variable $x_1$: 0.97), time in step 1 (correlation coefficient with variable $x_1$: 0.99), the average R-axis position in step 1 (correlation coefficient with variable $x_1$: 0.99), the R-axis position standard deviation (correlation coefficient with variable $x_1$: 0.99), the R-axis speed average (correlation coefficient with variable $x_1$: 0.97), the R-axis speed average (correlation coefficient with variable $x_1$: −0.96), and the like. It may be expected that the estimation accuracy may be further improved by using any of these variables in place of $x_1$ or in combination with $x_1$.

Fourth Embodiment

Variables that have a high correlation with (being replaceable with) this variable $x_2$ include, for example, the time in step 2 (correlation coefficient with variable $x_2$: −0.77), the R-axis position standard deviation in step 2 (correlation coefficient with variable $x_2$: −0.75), the R-axis speed standard deviation (correlation coefficient with variable $x_2$: 0.94), the R-axis torque average (correlation coefficient with variable $x_2$: 0.84), the Z-axis position range (maximum value of Z-axis position−minimum value of Z-axis position) (correlation coefficient with variable $x_2$: −0.74), and the like. It may be expected that the estimation accuracy may be further improved by using any of these variables in place of $x_2$ or in combination with $x_2$.

Fifth Embodiment

Figure 10:
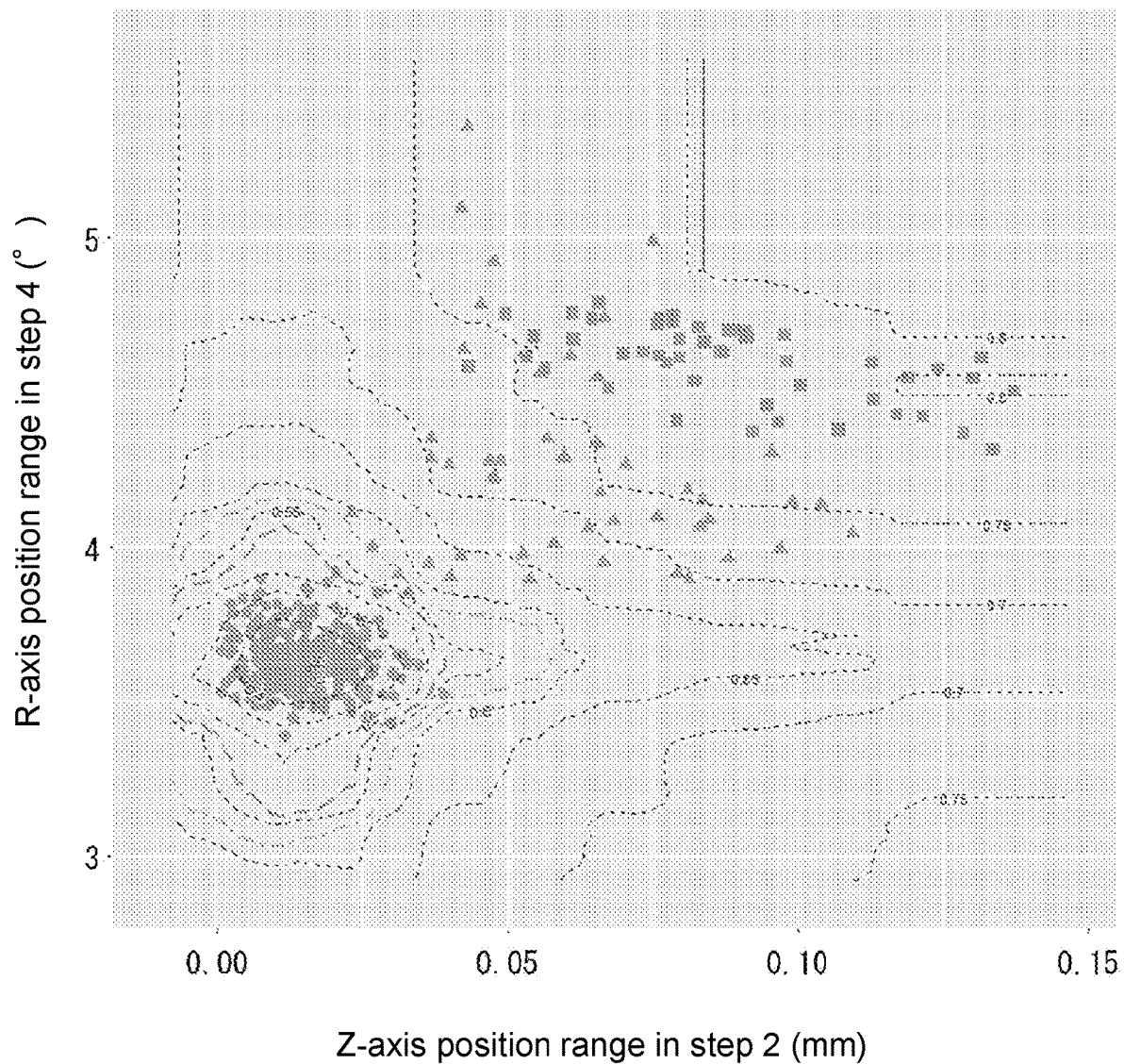
FIG. 10 is a graph plotting the Z-axis position range in step 2 versus the R-axis position range in step 4 for each of the samples of Normal and Abnormal 2 to 5 shown in FIG. 8 where bottom hitting occurs.

FIG. 10 is a graph plotting the Z-axis position range in step 2 versus the R-axis position range in step 4 for each of the samples of Normal and Abnormal 2 to 5 shown in FIG. 8 where bottom hitting occurs. FIG. 10 shows that with the ability to estimate the axial force of the screw by using the R-axis position range as described above, the determination accuracy is good when quality determination is made by two-dimensional plotting using the R-axis position range and other variables.

In this graph, the horizontal axis is the Z-axis position range (mm) in step 2, and the vertical axis is the R-axis position range (°) in step 4. The points of each sample correspond to the points each sample of Normal and Abnormal 2 to 5 shown in FIG. 8 where bottom hitting occurred.

A score is calculated by applying isolation forest, which is a technique of machine learning, to the Z-axis position range in step 2 and the R-axis position range in step 4 of each sample. In FIG. 10, the contour lines indicate the scores, and it may be seen that the samples in the normal state concentrate on scores of 0.55 or less. In this way, it is possible to determine that a sample with a score less than or equal to a predetermined value indicates that driving has been performed normally.

As described above, the control part 31 applies the isolation forest to the Z-axis position range in step 2 and the R-axis position range in step 4 of each sample to estimate the axial force of the screw; therefore, it becomes possible to easily determine the quality of the driving of the screw based on the numerical value.

§ 4 Modified Example

The control block (especially the control part 31) of the screw driving device 1 may be implemented by a logic circuit (hardware) formed in an integrated circuit (IC chip) or the like, or may be implemented by software.

In the latter case, the screw driving device 1 includes a computer that executes program instructions, which are software for realizing each function. This computer includes, for example, one or more processors, and a computer-readable recording medium storing the program. In the computer, the processor reads the program from the recording medium and executes it, thereby achieving embodiments of the disclosure. As the processor, for example, a central processing unit (CPU) may be used. As the recording medium, a "non-transient tangible medium" such as a read only memory (ROM), a tape, a disk, a card, a semiconductor memory, a programmable logic circuit, or the like may be used. Further, a random access memory (RAM) for developing the above program may be further provided. Further, the program may be supplied to the computer via any transmission medium (communication network, broadcast wave, and the like) capable of transmitting the program. In addition, one embodiment of the disclosure may also be implemented in the form of a data signal embedded in a carrier wave in which the program is embodied by electronic transmission.

SUMMARY

The disclosure adopts the following configurations in view of the above-described problems. A screw driving device according to an embodiment of the disclosure includes: a rotary tool for rotating a screw; a first motor that drives the rotary tool to rotate; and a control part that controls the first motor. The control part: applies a predetermined torque generated by the first motor to the screw in a rotation direction where the screw is driven, then performs a step of releasing the torque, and estimates an axial force of the driven screw based on a change of a rotation position of the first motor in the step of releasing the torque.

According to the above configuration, since the axial force of the driven screw is estimated based on the change in the rotation position of the first motor, there is no need to measure the actual axial force of the screw, making it easy to determine the quality of the driving of the screw.

The above screw driving device according to an embodiment of the disclosure further includes a second motor controlled by the control part for moving the rotary tool in an axial direction. The control part performs: a first step of screwing the screw into a screw hole, in which the first motor is set at a predetermined rotation speed and the rotary tool is moved by the second motor until the torque generated by the first motor reaches a threshold torque; and a second step of increasing the torque generated by the first motor until the torque reaches the predetermined torque for full driving of the screw.

According to the above configuration, the screw may be properly seated by the first step. In addition, the second step enables proper full driving of the screw.

In the above screw driving device according to an embodiment of the disclosure, the control part estimates the axial force by reflecting variations in a torque of the second motor in the first step.

According to the above configuration, it is possible to estimate the axial force in consideration of whether the screw is successfully seated. Therefore, it is possible to estimate the axial force more accurately than estimating the axial force only from the change in the rotation position of the first motor.

In the above screw driving device according to an embodiment of the disclosure, the control part estimates the axial force by reflecting any one of an average position of the rotary tool by the second motor, a time of the first step, an average rotation position of the first motor, a standard deviation of a rotation position of the first motor, an average rotation speed of the first motor and a standard deviation of a rotation speed of the first motor in the first step.

According to the above configuration, the axial force of the screw may be estimated using any one of the variables. Therefore, the axial force of the screw may be estimated using a variable that may be obtained more easily than the variation in the torque of the second motor.

In the above screw driving device according to an embodiment of the disclosure, the control part estimates the axial force by reflecting an average value of the rotation speed of the first motor in the second step.

According to the above configuration, it is possible to estimate the axial force in consideration of whether the full driving of the screw is normally performed. Therefore, it is possible to estimate the axial force more accurately than estimating the axial force only from the change in the rotation position of the first motor.

In the above screw driving device according to an embodiment of the disclosure, the control part estimates the axial force by reflecting any one of a time of the second step, a standard deviation of a rotation position of the first motor in the second step, a standard deviation of a rotation speed of the first motor, an average of the torque of the first motor, and a range of positions of the rotary tool by the second motor.

According to the above configuration, the axial force of the screw may be estimated using any one of the variables. Therefore, the axial force of the screw may be estimated using a variable that may be obtained more easily than the average value of the rotation speed of the first motor.

In the above screw driving device according to an embodiment of the disclosure, the control part determines a quality of driving of the screw based on a change in a position of the rotary tool caused by the second motor in the second step and the estimated axial force.

According to the above configuration, it is possible to determine the quality of the driving of the screw in multiple ways.

In the above screw driving device according to an embodiment of the disclosure, the control part determines the quality of the driving of the screw based on a score obtained by applying an isolation forest to the change in the position of the rotary tool caused by the second motor in the second step and the estimated axial force.

According to the above configuration, since the isolation forest is applied to determine the quality of the driving of the screw, it is possible to objectively determine the quality of the driving of the screw based on numerical values.

In the above screw driving device according to an embodiment of the disclosure, the control part performs a step of maintaining the predetermined torque for a predetermined period of time just prior to the step of releasing the torque.

According to the above configuration, the screw may be driven by maintaining the predetermined torque for the predetermined period of time.

The disclosure is not limited to the above-described embodiments, various modifications may be made possible within the scope of the claims, and embodiments obtained by appropriately combining technical methods disclosed in different embodiments are also included in the technical scope of the disclosure. In each embodiment, step 3 is not necessarily required and may be omitted.

What is claimed is:

1. A screw driving device comprising:
   driver bit, configured to rotate a screw;
   a first motor, configured to drive the driver bit to rotate; and
   controller, configured to control the first motor,
   wherein the controller is configured to:
      apply a predetermined torque generated by the first motor to the screw in a rotation direction where the screw is driven, then perform a step of releasing the torque, wherein
         at a start of the step of releasing the torque, the controller is configured to acquire a first rotation angle of a rotation axis of the first motor, and
         at an end of the step of releasing the torque, the controller is configured to acquire a second rotation angle of the rotation axis of the first motor; and
      determine an axial force of the driven screw based on a change of a rotation position of the first motor in the step of releasing the torque, wherein the axial force is along a direction of the rotation axis.

2. The screw driving device according to claim 1, further comprising a second motor controlled by the controller for moving the driver bit in an axial direction,
   wherein the controller performs:
   a first step of screwing the screw into a screw hole, wherein the first motor is set at a predetermined rotation speed and the driver bit is moved by the second motor until the torque generated by the first motor reaches a threshold torque; and
   a second step of increasing the torque generated by the first motor until the torque reaches the predetermined torque for full driving of the screw.

3. The screw driving device according to claim 2, wherein the controller is configured to determine the axial force by reflecting variations in a torque of the second motor in the first step.

4. The screw driving device according to claim 3, wherein the controller is configured to determine the axial force by reflecting an average value of the rotation speed of the first motor in the second step.

5. The screw driving device according to claim 4, wherein the controller is configured to determine a state of driving of the screw is a normal state or an abnormal state based on a change in a position of the driver bit caused by the second motor in the second step and the determined axial force.

6. The screw driving device according to claim 3, wherein the controller is configured to determine the axial force by reflecting any one of a time of the second step, a standard deviation of a rotation position of the first motor in the second step, a standard deviation of a rotation speed of the first motor, an average of the torque of the first motor, and a range of positions of the driver bit by the second motor.

7. The screw driving device according to claim 6, wherein the controller is configured to determine a state of driving of the screw is a normal state or an abnormal state based on a change in a position of the driver bit caused by the second motor in the second step and the determined axial force.

8. The screw driving device according to claim 3, wherein the controller is configured to determine a state of driving of the screw is a normal state or an abnormal state based on a change in a position of the driver bit caused by the second motor in the second step and the determined axial force.

9. The screw driving device according to claim 2, wherein the controller is configured to determine the axial force by reflecting any one of an average position of the driver bit by the second motor, a time of the first step, an average rotation position of the first motor, a standard deviation of a rotation position of the first motor, an average rotation speed of the first motor and a standard deviation of a rotation speed of the first motor in the first step.

10. The screw driving device according to claim 9, wherein the controller is configured to determine the axial force by reflecting an average value of the rotation speed of the first motor in the second step.

11. The screw driving device according to claim 10, wherein the controller is configured to determine a state of driving of the screw is a normal state or an abnormal state based on a change in a position of the driver bit caused by the second motor in the second step and the determined axial force.

12. The screw driving device according to claim 9, wherein the controller is configured to determine the axial force by reflecting any one of a time of the second step, a standard deviation of a rotation position of the first motor in the second step, a standard deviation of a rotation speed of the first motor, an average of the torque of the first motor, and a range of positions of the driver bit by the second motor.

13. The screw driving device according to claim 9, wherein the controller is configured to determine a state of driving of the screw is a normal state or an abnormal state based on a change in a position of the driver bit caused by the second motor in the second step and the determined axial force.

14. The screw driving device according to claim 2, wherein the controller is configured to determine the axial force by reflecting an average value of the rotation speed of the first motor in the second step.

15. The screw driving device according to claim 14, wherein the controller is configured to determine a state of driving of the screw is a normal state or an abnormal state based on a change in a position of the driver bit caused by the second motor in the second step and the determined axial force.

16. The screw driving device according to claim 2, wherein the controller is configured to determine the axial force by reflecting any one of a time of the second step, a standard deviation of a rotation position of the first motor in the second step, a standard deviation of a rotation speed of the first motor, an average of the torque of the first motor, and a range of positions of the driver bit by the second motor.

17. The screw driving device according to claim 16, wherein the controller is configured to determine a state of driving of the screw is a normal state or an abnormal state based on a change in a position of the driver bit caused by the second motor in the second step and the determined axial force.

18. The screw driving device according to claim 2, wherein the controller is configured to determine a state of driving of the screw is a normal state or an abnormal state based on a change in a position of the driver bit caused by the second motor in the second step and the estimated determined axial force.

19. The screw driving device according to claim 18, wherein the controller is configured to determine a state of the driving of the screw based on a score obtained by applying an isolation forest to the change in the position of the driver bit caused by the second motor in the second step and the determined axial force.

20. The screw driving device according to claim 1, wherein the controller performs a step of maintaining the predetermined torque for a predetermined period of time just prior to the step of releasing the torque.

* * * * *